UNITED STATES PATENT OFFICE.

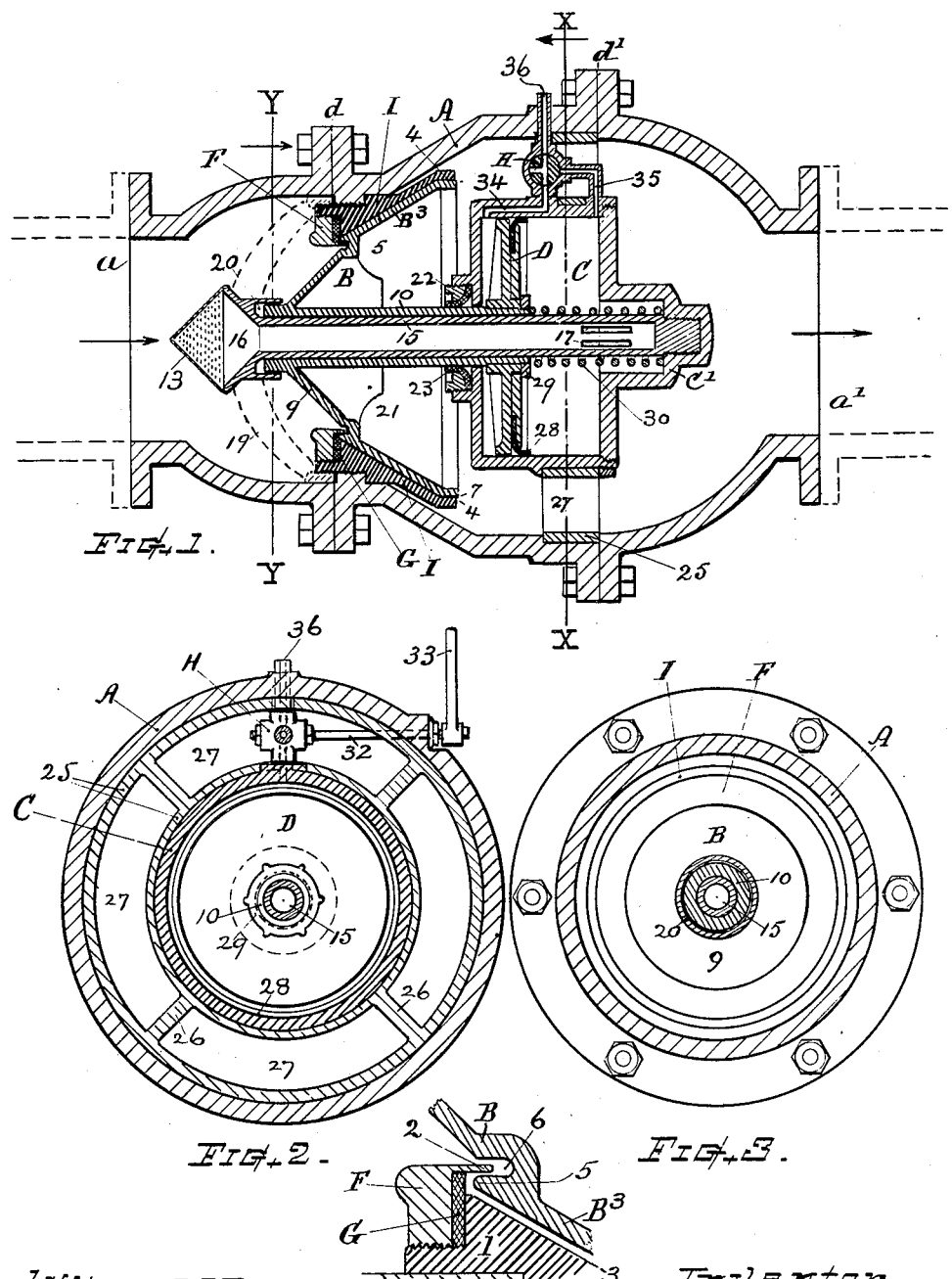

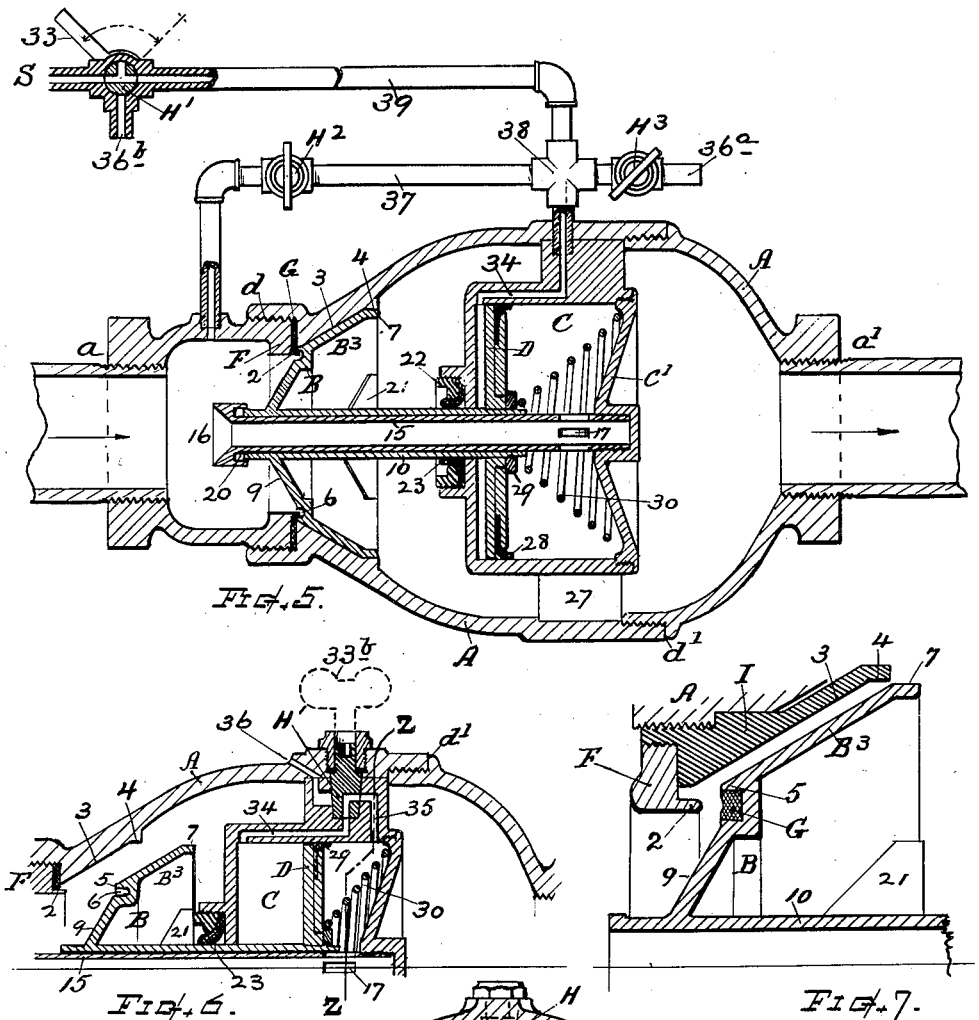

HENRY A. DESPER, OF WORCESTER, MASSACHUSETTS.

HYDRAULIC VALVE.

No. 845,063.  Specification of Letters Patent.  Patented Feb. 26, 1907.

Application filed January 23, 1906. Serial No. 297,440.

*To all whom it may concern:*

Be it known that I, HENRY A. DESPER, a citizen of the United States, residing at Worcester, in the county of Worcester and State of Massachusetts, have invented a new and useful Hydraulic Valve, of which the following is a specification, reference being made therein to the accompanying drawings.

The object of my present invention is to provide a practical and efficient quick-action valve for large water-mains, hydrants, standpipes, and other water-service pipes and for heavy pressures, which valve is controlled by an easily-operated auxiliary device, and having novel features of construction whereby shock or water-hammer at the closing of the valve is obviated or neutralized to a degree that renders it non-injurious.

My invention consists in mechanism embodying the construction of parts, combinations, and mode of operation explained in the following detailed description and illustrated in the accompanying drawings, the particular subject-matter claimed being definitely stated in the summary.

In the drawings, Figure 1 represents a longitudinal central section of a hydraulic-valve mechanism embodying my invention as adapted for large valves. Fig. 2 represents a transverse section at line X X on Fig. 1 looking toward the front end. Fig. 3 represents a transverse section at line Y Y looking rearward. Fig. 4 is a fragmentary detail section across the valve-seat. Fig. 5 represents a longitudinal central section of my invention as adapted for smaller-sized valves, also showing a form of controlling connection whereby the action can be regulated and an attachment whereby the action can be controlled from a distant station. Fig. 6 is a half-section view showing a modification in the form of the controlling-cock. Fig. 7 represents a half-section view of the valve and valve-seat and showing a modification in the form of packing, and Fig. 8 is a transverse section at the position of line Z Z on Fig. 6.

In the construction of my improved hydraulic valve as shown by the drawings the part marked A represents a casing or shell of suitable size and shape for forming the waterway and containing the operating parts. Said casing is provided at its ends $a$ and $a'$ with coupling hubs, flanges, or other well-known means for connecting it with the line of service-pipe, water-main, fire-hydrant stand-pipe, or other situation where used.
In the present instance this shell is made in three united sections securely joined together at $d$ and $d'$.

B indicates the main valve, and C a pressure-cylinder containing a piston D for moving said valve. The idea of moving a valve by a piston and water-pressure thereon is old in the arts, and it will therefore be understood that such idea, broadly, is not made the gist of my present invention.

Within the shell A there is arranged and properly supported a ring member or circular valve-seat F, preferably having a backwardly-projecting cylindrical lip 2 about its central opening. A gasket or ring G, of leather or other suitable packing material, is arranged against said valve-seat to form the closure-face between it and the valve. Extending rearwardly from the valve-seat there is a supplementary seat I, presenting an internally-conoidal surface 3, disposed with its smaller diameter adjacent to the ring-seat and increasing rearwardly and terminating with a short cylindric surface 4 at its rear edge. In large-sized apparatus this supplementary seat I is best made as a separate piece, preferably secured within the casing A, as indicated in Fig. 1 and Fig. 7; but in the smaller-sized apparatus it may be formed integral or with the conoidal surface 3 directly upon the interior of the casing, as illustrated in Figs. 5 and 6.

The valve B in accordance with my invention is closable in opposition to the flow and is formed with a ring-seating face 5, having a groove 6, that renders the seating portion comparatively narrow and affords space for receiving the lip 2 of the valve-seat ring. Rearward from the ring-seating face 5 there is a conoidal follower-rim or flange $B^3$, the width of which is equal to about one-half the diameter of the valve-seat ring, more or less, and projecting rearward in the main waterchamber, with the exterior surface thereof conoidally diverging from the ring-seating face and fitted to approximately countermatch the interior surface 3 of the supplementary valve-seat I when the valve is closed and having a cylindrical peripheral portion 7 at its rear edge. The front of the valve may be of any suitable shape, but is preferably formed with a conical nose, as at 9, for deflecting the current toward the periphery. The valve is provided with a concentric hollow stem or sleeve 10, that extends into the cylinder C and has the piston D fixed upon the end thereof. Said hollow stem is fitted to slide upon a central stationary tubular guide-shaft 15, that extends from within the cylinder to a position forward of the valve B, and has where its front end is open and preferably formed with a bell or enlarged funnel-shaped mouth 16 for concentrating the force of the current thereinto, while at its rear part it has suitable openings 17, communicating with the interior of the cylinder C at the back of the piston D. This tubular guide-shaft 15 is supported by having its rear end secured in the rear cylinder-head C'. If in any instance desired, it may also be supported at its fore end by spider-arms fixed thereon and reaching to a ring adjacent to the valve-seat, as indicated by dotted lines 19 on Fig. 1. The front end of the valve-stem is fitted to enter a cup or dash-pot groove 20, formed around the center tube 15, which parts are adapted for giving yielding resistance as the valve approaches its seat.

A cup-leather packing 23 is provided about the stem 10 where it enters the cylinder, a suitable ring-flange being formed on the cylinder-head and threaded washer 22, fitted therein, for holding said cup-leather, as shown.

The cylinder C is supported concentric within the casing A by a removable annulus 25, comprising outer and inner rings integrally united by webs or arms 26 (see Fig. 2) and having waterway-spaces 27 between them. The exterior of said annulus is made to fit a seating-surface on the interior of the shell A, and the interior of the annulus is fitted to a concentric seating-surface on the outside of the cylinder, so that the cylinder is maintained firm and central. The annulus and cylinder are confined in place by the closing of the uniting-joint d' of the shell. In small valves the arms or webs 26 may be made integral with the cylinder, as shown in Fig. 8.

The piston D is provided with a rearwardly-flanged cup-leather packing 28, and said piston is confined to the valve-stem 10 by a nut 29. An expanding coiled spring 30 is arranged between the piston and rear cylinder-head, the purpose of which is to normally press the parts to forward position when there is no backwater-pressure or when the valve is not in use; but the operation of the mechanism when in use is not dependent upon the spring, and said spring can in some instances be omitted, if so desired. The direction in which the water flows through the main waterway is indicated by arrows at the center line.

H indicates a three-way cock, preferably disposed within the casing and having means, as the stem 32 and hand-lever 33, for operating it from the exterior. Communicating with said cock there is a passage 34 from the interior of the cylinder forward of the piston, a passage 35 from the interior rear part of the cylinder, and a passage 36 to the exterior of the casing, or an outside discharge.

In large-sized hydraulic valves I provide a conical-pointed screen or strainer 13, arranged in the bell or flaring mouth 16 of the tubular guide-shaft 15, as indicated in Fig. 1, for preventing fish, eels, or floating substances from entering the cylinder. The conical form enables the surface to be washed clear without causing an accumulation that would retard the action or interfere with the flow through the main valve.

In Fig. 6 there is shown a modification in the form of the controlling-cock adapted for the smaller sizes of valves. In this the cock is made as a plug H' with its axis disposed radial to the shell, its ports being in the end and side thereof, also showing the plug as made for operation by a detachable key 33[b]. (Indicated by dotted lines.)

Fig. 7 shows a modification in which the contact-packing G is fitted into the groove in the face of the valve B and adapted to close against the edge of the lip 2 of the valve-seat ring F. For very large valves this form requires less leather for packing than does the form shown in Fig. 4; but the latter form is preferred for moderate-sized valves, as the lip 2 protects the edge of the packing-ring against the rushing force of the water passing through the opening when the valve is away from its seat.

The operation is as follows: When cock H is set as shown in Fig. 1, the force of the head-water acting through the tubular shaft 15 exerts its pressure on the back of the piston D, which is made of sufficient area to overcome the pressure on the valve and the friction of the parts, and as the pressure on the front of the piston is relieved through the passage 34 and outlet 36. The piston which is fixed to the valve-stem forces the valve B firmly to its seat, thereby cutting off the flow of water through the main waterway. When it is desired to open the main valve, the hand-lever 33 is swung over, shifting the cock H, so that its ports connect the passages 34 and 35 and close off the passage 36. Then pressure within the cylinder C is equalized at both sides of the piston, and the head-pressure against the valve B forces said valve rearward, opening the waterway through the valve-seat channel and between the coned surfaces. The opening movement of the valve is arrested by the ribs or fins 21, formed on the back of the valve, coming in contact with the packing-seat rim or washer 23 at the front of the cylinder. When it is desired to close the valve, controlling-cock H is turned to its primary position, thereby relieving the pressure at the front of the piston, and the valve is closed, as first above explained. In the closing action the counter-matching rearwardly-enlarged cone-surfaces of the supplementary seat I and apron B³ when the valve is nearly closed serve to thin out the stream passing through, and as the area at the rear part thereof is greater than the area near the valve-seat it tends to check the movement and at the same time to draw the valve toward the seat slowly and without irregular movements, while at the same time the ring-seat groove 6 and valve-seat lip 2 cause the water to assume an S-shaped current that checks the movement with a gradual resistance and prevents shock of the valve against the packing-face. The straight or cylindrical surfaces at 7 and 4 serve to approximately cut off the flow just before the face of the valve strikes the seat and so throttling the stream that the closing action is effected without sudden shock, thereby obviating or reducing the water-hammer effect to a degree that is nugatory or non-injurious to the system.

By arranging the controlling-cock H within the shell it is protected from liability of damage in case the valve mechanism is erected in exposed positions.

In Fig. 5 there is illustrated a modification wherein the passage 34 is connected by a pipe 37 with the waterway in front of the main valve B and an outlet-pipe 36ª by a T or cross-fitting 38 exterior to the body-shell A. There is a separate stop-cock H² arranged in the pipe 37 and a stop-cock H³ in the outlet-pipe 36ª. These two stop-cocks are operated the one H² for letting the water-pressure from the main into the front chamber of the cylinder C and the one H³ for relieving the pressure in said front chamber. In this instance the passage 35 is omitted. With the two cocks H² and H³ the speed at which the main valve B moves can be variously regulated or controlled by opening one of said cocks more or less in proportion to the opening of the other, or, again, by opening cock H² sufficient to allow a short movement of the piston and then closing it the valve can be held partially open. There is also shown in Fig. 5 means for controlling the valve from a distant station. This consists of a pipe 39, connecting the cylinder-passage 34 with the source of water-supply at a point S any desired or convenient distance from the hydraulic valve and having the three-way cock H' and outlet 36ᵇ arranged at the station from which control is desired to be effected. Manipulation of the cock H' changes the pressure and direction of flow in pipe 39 and effects movements of the piston C for opening or closing the valve B by equalizing or relieving the pressure in the front chamber of the cylinder, as hereinbefore explained.

I claim—

1. A hydraulic-valve mechanism, comprising the body-casing, a valve-seat therein, an open stationary tubular guide-shaft, a valve having a hollow stem slidable on said guide-shaft; in combination with the pressure-cylinder fixed within the casing and containing the end of said guide-shaft, the piston within said cylinder secured to the end of the hollow valve-stem and movable on said tubular guide-shaft, and means for controlling pressure within the cylinder to effect movement of said piston.

2. In a hydraulic-valve mechanism, a valve-seat comprising a circular ring-seat with a supplementary rearwardly-enlarged conoidal extension-surface, a valve having a circular ring-seating face that abuts against said ring-seat, and provided with a rearwardly-enlarged conoidal member diverging from the ring-seating face and projecting into the main water-chamber as an internally-open flange approximately counter-matching the surface of the valve-seat extension; said conoidal member of the valve adapted to approximately close upon the conoidal extension-surface with the closing of its ring-seating face, for the purpose set forth.

3. In a hydraulic-valve mechanism of the class described, the combination of a valve having a ring-face with a rearwardly-flaring conical flange or follower-rim, and a valve-seat having a ring-face and a rearwardly-enlarged supplementary extension, the conical counter-matching surfaces arranged to close upon each other approximately simultaneous with the closure of the ring-faces, said conical flange portions each terminating within the main water-chamber with a short straight cylindrical portion at their rear edge, for the purpose set forth.

4. In a hydraulic-valve mechanism of the class described, the combination with the body-casing, of a valve-seat ring, a supplementary rearwardly-enlarged seating member having an internally-coned surface, a valve having a ring-seating face and a rearwardly-enlarged follower-rim with an externally-coned surface, and means for automatically moving said valve.

5. In a hydraulic-valve mechanism of the class described, in combination with the valve-seat ring having a rearwardly-projecting lip, the packing-ring and rearwardly-enlarged extension with internal-coned surface; a valve having a ring-seat face provided with a groove for receiving said lip, and a rearwardly-extended conoidal rim, and means for automatically operating said valve.

6. In a hydraulic-valve mechanism, in combination, with a suitable casing, a valve, a pressure-cylinder and a piston within said cylinder for operating said valve, of a tubular valve-supporting guide through which water-pressure is admitted from the waterway in front of the valve to the interior of said cylinder.

7. In a hydraulic-valve mechanism, the combination of the casing having a waterway therethrough, and means for its attachment to a service main or pipe, a valve-seat and a pressure-cylinder fixed within said casing, a tubular valve-supporting guide open at its front and leading into the cylinder, a valve movable on said tubular guide and having a ring-face closable against the valve-seat, a piston movable within the cylinder and attached to the valve-stem, passages for the inlet and discharge of water into and from the cylinder at the front of the piston, and means substantially as described for controlling said passages.

8. In a hydraulic-valve mechanism of the class described, the combination with the annular valve-seat, the seat-packing, the rearwardly-enlarged supplementary seat having conoidal interior surface, and a central tubular guide-shaft; of the valve mounted to slide on said tubular guide-shaft and having the conoidal deflecting-nose, the ring-seating face and rearwardly-enlarged conoidal rim, a cylinder and piston for operating said valve, and means substantially such as described for controlling the pressure within the cylinder-chambers.

9. In a hydraulic-valve mechanism, the combination substantially as described, of the casing, the valve-seat ring, the cylinder supported stationary within the casing, a central tubular guide-shaft connecting with said cylinder and open at the front of the valve, a valve closable on said valve-seat in opposition to the flow and having a hollow stem slidably mounted on said guide-shaft, a piston fixed on said stem within the cylinder, water-passages from the chambers of said cylinder, a three-way cock controlling said passage, and means external of the shell for turning said cock.

10. In a hydraulic-valve mechanism, the combination with the main casing, the cylinder, the central tubular guide-shaft leading thereinto, the valve having a hollow stem slidable on said guide-shaft, and a piston attached to said valve-stem within the cylinder, of a ring-flange on the cylinder-head, and a cup-leather held therein and surrounding said valve-stem, substantially as set forth.

11. In a hydraulic-valve mechanism, in combination with the main casing, the pressure-cylinder, valve-operating piston and valve having the hollow stem; the central tubular guide-shaft communicating with the interior of the cylinder and having the open enlarged mouth forward of the valve, for the purpose set forth.

12. In a hydraulic-valve mechanism of the class described, the tubular guide-shaft having the annular dash-pot groove, and the valve having the hollow stem slidable on said guide-shaft, said hollow stem being extended at the front of the valve and fitted for resistingly entering said dash-pot groove, in combination with the casing inclosing the waterway, the valve-seat, and means for closing said valve.

13. In a hydraulic-valve mechanism of the class described, the removable annulus comprising outer and inner rings united by arms or webs and having waterway-spaces between, in combination with the cylinder having an external seat for the inner ring, the divided shell having a seat for the outer ring, the central guide-shaft, the valve sliding thereon, the piston connected with the valve-stem, and the concentric valve-seat, substantially as set forth.

14. In a hydraulic-valve mechanism of the character described, the combination with the valve, the cylinder, valve-actuating piston, and tubular valve-supporting shaft having the bell-mouth and passage leading into the cylinder; of a pointed conical strainer fitting over the mouth of said tubular shaft, substantially as and for the purpose set forth.

15. In a hydraulic-valve mechanism, in combination with the casing or shell including a waterway and valve-seat, the valve, tubular valve-supporting guide-shaft, valve-actuating piston and cylinder, of the expanding coiled spring disposed within the cylinder at the back of the piston and exerting tension for forcing the valve toward its seat.

Witness my hand this 15th day of January, 1906.

HENRY A. DESPER.

Witnesses:
CHAS. H. BURLEIGH,
ELLA P. BLENUS.